Feb. 18, 1969   M. J. H. BODEN   3,428,165
SCREW CONVEYOR
Filed Jan. 30, 1967   Sheet 1 of 2
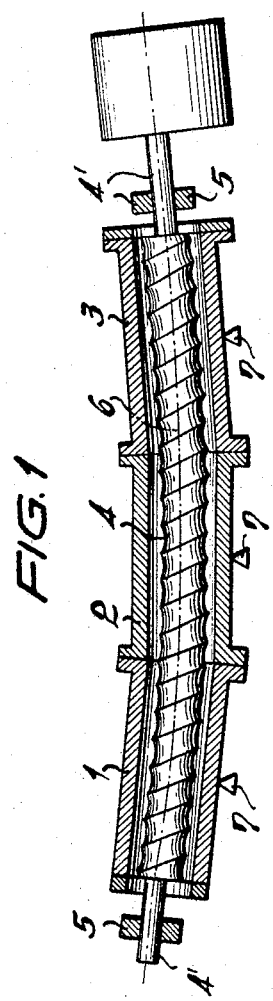
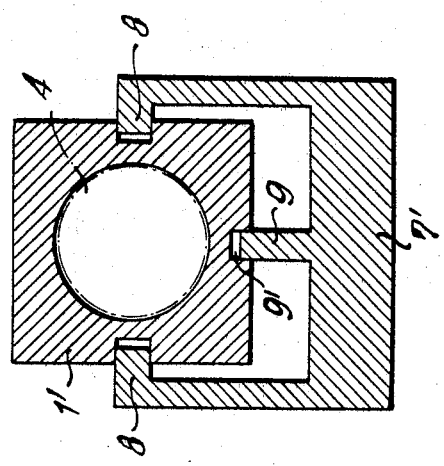
INVENTOR
HELLMUT MAX JOHANNES BODEN
ATTORNEYS

INVENTOR
HELLMUT MAX JOHANNES BODEN

United States Patent Office 3,428,165
Patented Feb. 18, 1969

3,428,165
SCREW CONVEYOR
Max J. Hellmut Boden, Korb, Germany, assignor to Werner & Pfleiderer, Stuttgart-Feuerbach, Germany, a corporation of Germany
Filed Jan. 30, 1967, Ser. No. 612,612
Claims priority, application Germany, Feb. 3, 1966, W 41,059
U.S. Cl. 198—213
Int. Cl. B65g 33/24
7 Claims

ABSTRACT OF THE DISCLOSURE

A material treating installation comprising a screw slowly revolving with clearance within a single or multiple housing the bore of which is larger in cross-section than the screw which is journalled at both ends in non-rotatable bearings and provided to convey material to be treated through the housing, the housing bore, at least in its lower portion, being formed of arcuate sections or straight sections arranged arcuately in series, so as to follow the deflection of the screw caused by the operation thereof.

---

This invention concerns a screw conveyor and in particular relates to screw conveyors in which screws exceeding a given size, operate at a very low speed, and which are provided for materials to be treated which may be conveyed only with difficulty since they necessitate the maintenance of prescribed temperatures and have neither strength nor lubricating effect.

For the continuous conveyance of materials of this kind i.e. in screw conveyors, it has sometimes been necessary for several short screws to be connected in series in separate housings, so as to eliminate heating effects due to friction caused by the sag of a long screw bringing the screw into contact with the interior surface of its housing.

It is the object of the present invention to provide a screw conveyor in which delicate products may be conveyed by means of one or more long screws rotating within, and extending throughout the length of, a common housing without the need to support the screw or screws at individual points of the housing to eliminate the inevitable deflection or sag of the screw.

According to the present invention, there is provided a screw conveyor having one or more screws extending in respective bores throughout the entire length of the housing, with each screw having a cross section less than that of its respective bore so as to have clearance with the inner surface of its bore. The screws are supported only at opposite ends in non-adjustable bearings and are provided to convey material through the housing. The housing is formed of arcuate sections or straight sections arranged arcuately, in series so as to conform to the normal sag of the screw.

This ensures that there are no points of contact between the screw and the housing, thus eliminating points of high friction, so that an accurately controlled throughput of the product is ensured and the screw can be of any size. In order to ensure simple manufacture more especially of large screws, it is preferable for the conveyor housing to be formed from a series of connected sections, each of which has a rectilinearly extending bore the individual housing sections being connected together in a longitudinally generally arcuate configuration to conform to the normal sag of the screw or screws. This measure, simplifies not only the manufacture but also the assembly and eliminates individual points of friction between the housing and the screws and hence uncontrollable influences on the product to be treated.

To permit the adaptation of the housing or housing sections to the screws, more particularly in the case of heated screws, the housing and/or the individual housing sections are supported in or near the vertical medial plane. The holder of the housing or the individual housing sections may be such that the housing or the individual housing sections are suspended or supported substantially in the region of the horizontal medial plane. The arrangement is preferably such that the support and suspension are each combined in a common pedestal bearing, so that advantages from a manufacturing and assembly point of view are provided.

It is advantageous for the housing or housing sections to be suspended or supported on weight compensating bearings, so that, on occurrence of temperature changes, the housing or housing sections may conform to any alteration in the size of the screws. The weight compensation may be effected either by hydraulic pistons or by other power storage means, such as spring assemblies or weights. The choice of weight compensation is thus effected according to size of the screw and the given operating conditions.

The invention will be further described, by way of example, with reference to the accompanying drawings, in which:

FIG. 1 is a simplified illustration of a screw conveyor embodying the invention, partly in section;

FIG. 2 is a cross-section through a housing with a screw shown on a larger scale than FIG. 1;

Figure 3:
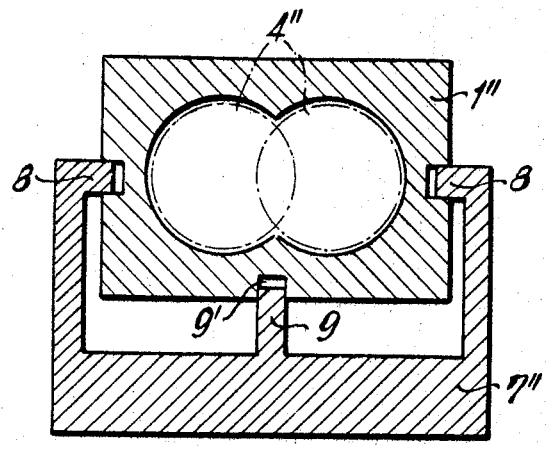
FIG. 3 is a cross section of another conveyor, embodying the invention, with two contra-rotating screws on a scale larger than FIG. 1.

Within a housing comprised of several interconnected sections 1, 2 and 3, a screw 4 is received, at each end of which a bearing pin 4' is rotatably mounted in pedestal bearings 5 shown schematically. The pedestal bearings 5 are fixed end screw 4 bends or sags under its own weight, as shown in FIG. 1 of the drawing by the medial axis 6 shown in chain-dotted lines. The individual sections 1, 2 and 3 of the housing are therefore disposed at an angle to one another following the curvature of the medial axis 6 and interconnected, so that the screw 6 is not supported anywhere along the inside wall surface of the individual housing sections 1, 2 or 3. The support of the individual sections 1, 2 and 3 of the housing is effected by means of the pedestal bearings 7 shown schematically in the drawing. The pedestal bearings 7, however, may also be provided on the flanges of the housing or the individual housing sections.

FIG. 2 of the drawing shows, by way of a simplified view, a pedestal bearing 7' for a housing 1' equipped with a screw 4 indicated by chain-dotted lines. The pedestal bearing 7' has lateral supporting arms 8 which engage in suitable grooves of the housing 1', in the horizontal medial plane of the housing. For vertical support, the pedestal bearing 7' is provided with a supporting finger 9 which is arranged in the vertical medial plane of the housing 1', i.e. arranged in the centre of the housing, and engages in a groove 9' of the housing. This arrangement ensures that the housing 1', if subjected to an increase in temperature, is able to expand in all directions and hence points of friction between the screw 4 and the housing 1' are eliminated.

FIG. 3 of the drawing shows the suspension of a housing 1″ for two screws 4″, the pedestal bearing 7″ also being provided with horizontal arms 8 and a substantially vertically upright finger 9 engaging in a groove 9′. The arms 8 also engage in the horizontal medial plane of the housing 1″, whilst the supporting fingers 9 are arranged in the vertical medial plane of the housing 1″.

FIGS. 2 and 3 show that the supporting fingers 9 serve only laterally as guide for the housing 1' or 1", on their top surface however they are not supported on the bottom of the groove 9', so that the housing following the line of bend of the screw may deflect. The height of the arms 8, of the pedestal bearing 7 or 7' and 7" is determined by adjusting the pedestal bearings themselves.

Figure 4:
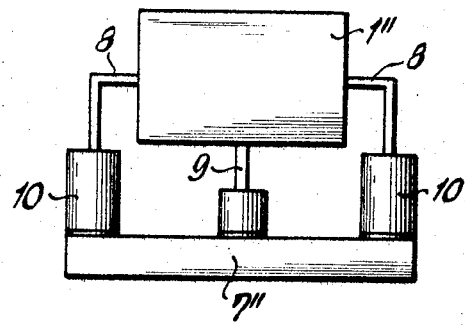
FIG. 4 is a schematic view of a weight compensating suspension for a housing.

FIG. 4 of the drawing shows a housing 1" for two screws, the arms 8 being connected to hydraulic pistons 10. These serve the purpose of adjustable weight support so that the adjustment of the position of the individual pedestal bearing 7, 7' or 7" may correspond accurately to the deflection of the screw. The arms 8 and hydraulic pistons 10 may also have associated therewith a supporting finger 9, associated with the illustrated hydraulic piston, all components being arranged on a mutual bearing plate and hence forming a pedestal bearing 7".

Modifications of the weight compensation means are possible, since in place of the hydraulic compensating device and compensating weight or power storage system shown in FIG. 4 of the drawing, spring assemblies or the like may be used. In any case, the housing or the individual housing sections must conform to the curvature or sag of the screw, which may vary in dependence upon the speed and the size of the screw and its temperature. Friction between screw and inner wall surface of the housing is thus eliminated, so that delicate materials may be conveyed by only one conveyor stage without damage to the materials.

I claim:

1. A material conveying installation comprising, in combination, an elongated housing having, at one end, an inlet for material to be conveyed and, at the opposite end, an outlet for the conveyed material; at least one relatively elongated massive unitary one-piece screw extending through said housing, each screw having a cross sectional area less than that of a bore of said housing through which it extends, whereby each screw has clearance with the inner surface of said housing; each screw having a bearing shaft only at each end thereof and projecting from said housing; means supporting each screw only at its opposite ends, said means including a pair of fixed and non-adjustable bearings each supporting a bearing shaft for rotation; whereby each screw sags between its respective pair of bearings to assume a longitudinally arcuate configuration; said housing having a corresponding longitudinally arcuate configuration, between its ends, whereby the clearance of each screw with the housing remains substantially constant throughout the length of the screw; and means supporting said housing in its longitudinally arcuate configuration.

2. A material conveying installation according to claim 1, wherein said housing comprises a plurality of generally longitudinally arcuate sections arranged in series.

3. A material conveying installation according to claim 2, including means supporting each said housing section in a vertical medial plane.

4. A material conveying installation according to claim 2, including means supporting each said housing section substantially in the region of its horizontal medial plane.

5. A material conveying installation according to claim 2, wherein each said housing section is supported and suspended within a pedestal bearing.

6. A material conveying installation according to claim 1, wherein said housing comprises a plurality of sections each of which has a rectilinear longitudinal axis and bore, said sections being disposed in series and adopting a generally longitudinally arcuate configuration.

7. A material conveying installation comprising a screw conveyor, a housing of generally arcuate longitudinal cross section having an inlet one end thereof and an outlet at the opposite end thereof for material to be conveyed, a non-rotatable bearing arranged adjacent the inlet end of said housing and a non-rotating bearing arranged adjacent the outlet end of said housing, a screw conveyor journalled for rotation in said bearings for advancing material from said inlet end to said outlet end, means for rotating said screw conveyor at a slow speed, said screw adopting a generally arcuate longitudinal cross sectional configuration in operation whereby the clearance between the outer periphery of said screw and the inner surface of said housing remains substantially constant over their entire length, and a weight compensating bearing supporting and suspending each housing section.

References Cited

UNITED STATES PATENTS

| 1,053,645 | 2/1913 | Reimer | 198—213 |
| 2,279,201 | 4/1942 | Kozak | 198—213 |
| 3,121,683 | 2/1964 | Fowler | 198—213 |

FOREIGN PATENTS

| 674,276 | 4/1939 | Germany. |

RICHARD E. AEGERTER, *Primary Examiner.*